(12) United States Patent
Hughey

(10) Patent No.: US 10,513,195 B2
(45) Date of Patent: Dec. 24, 2019

(54) SYSTEM AND METHOD FOR THE IMPROVED RECOVERY OF KINETIC ENERGY

(71) Applicant: Parker I L.L.C., Flagstaff, AZ (US)

(72) Inventor: Charles E. Hughey, Granger, IN (US)

(*) Notice: Subject to any disclaimer, the term of this patent is extended or adjusted under 35 U.S.C. 154(b) by 13 days.

(21) Appl. No.: 15/684,553

(22) Filed: Aug. 23, 2017

(65) Prior Publication Data

US 2018/0099581 A1   Apr. 12, 2018

Related U.S. Application Data

(60) Provisional application No. 62/406,526, filed on Oct. 11, 2016.

(51) Int. Cl.
| | | |
|---|---|---|
| *B60L 15/20* | (2006.01) | |
| *B60L 7/10* | (2006.01) | |
| *B60L 50/90* | (2019.01) | |
| *B60L 58/10* | (2019.01) | |

(52) U.S. Cl.
CPC .......... *B60L 15/2045* (2013.01); *B60L 7/10* (2013.01); *B60L 50/90* (2019.02); *B60L 58/10* (2019.02); *B60L 2240/14* (2013.01); *B60L 2240/549* (2013.01); *B60Y 2400/14* (2013.01); *Y02T 10/645* (2013.01); *Y02T 10/7005* (2013.01); *Y02T 10/705* (2013.01); *Y02T 10/7283* (2013.01)

(58) Field of Classification Search
CPC .... B60L 15/2045; B60L 7/10; B60L 11/1851; B60L 11/002; B60L 2240/14; B60L 2240/549; Y02T 10/7005; Y02T 10/705; Y02T 10/7283; Y02T 10/645; B60Y 2400/14
See application file for complete search history.

(56) References Cited

U.S. PATENT DOCUMENTS

| | | | | |
|---|---|---|---|---|
| 5,343,970 A | * | 9/1994 | Severinsky | B60K 6/387 180/65.25 |
| 6,454,033 B1 | * | 9/2002 | Nathan | B60K 17/02 180/307 |
| 2003/0230933 A1 | * | 12/2003 | Schneider | B60K 6/445 303/146 |
| 2018/0257473 A1 | * | 9/2018 | Follen | B60K 6/20 |

* cited by examiner

*Primary Examiner* — Rodney A Butler

(57) ABSTRACT

A dual energy recovery, storage and use system comprising an electrically operated machine capable of regenerative electrical energy recovery, an electrically driven hydraulic regenerative energy recovery system which utilizes regenerative electrical energy to drive an electrically driven hydraulic pump/motor as a pump to pressurize hydraulic fluid in an accumulator, then uses the previously stored pressurized fluid to drive a hydraulic pump/motor as a motor to operate an electric motor/generator as a generator providing electricity to operate/assist in operating an electrically operated machine.

19 Claims, 1 Drawing Sheet

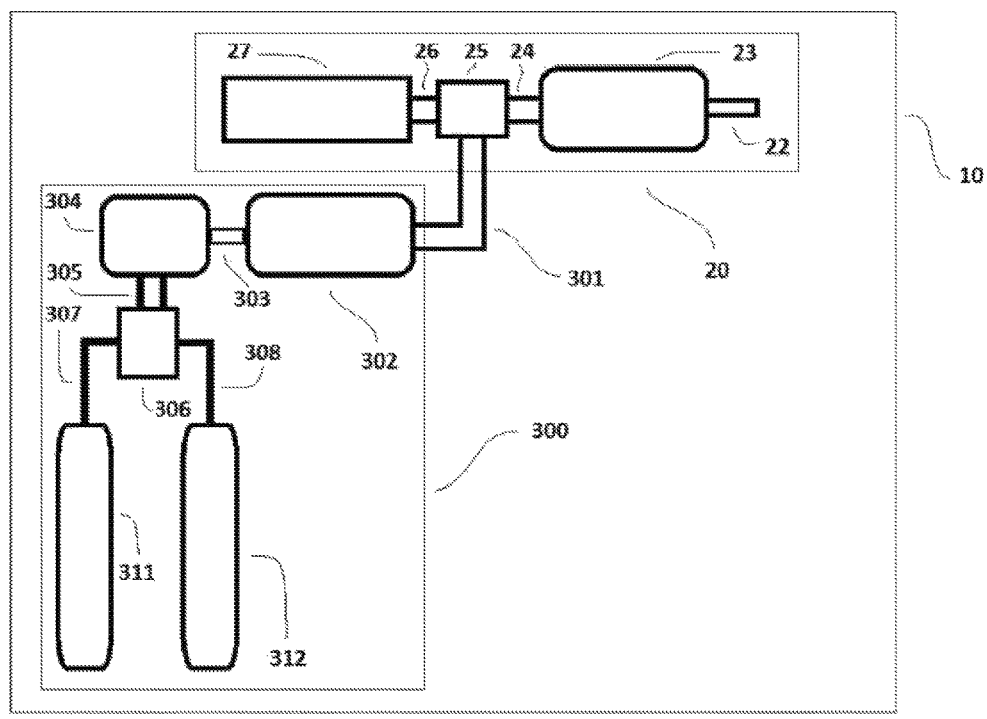

SYSTEM AND METHOD FOR THE IMPROVED RECOVERY OF KINETIC ENERGY

CROSS-REFERENCE TO RELATED APPLICATIONS

This application claims priority to U.S. Provisional Patent Application No. 62/406,526 filed on Oct. 11, 2016, entitled "SYSTEM AND METHOD FOR THE IMPROVED RECOVERY OF KINETIC ENERGY," the disclosure of which is incorporated herein by reference.

FIELD

The present disclosure relates generally to a fluid drive system for a vehicle, and in particular, to a fluid drive system having energy regeneration and storage capabilities.

BACKGROUND

In the continuing effort to provide more efficient and fossil fuel free modes of propulsion, systems have been developed which utilize recovery and reuse of kinetic energy, such as that present in moving vehicles. One such system is known as regenerative braking ("regen"), wherein deceleration forces are captured and converted to a storable medium and then reused for the next acceleration event. The most popular and most exploited version of this technology is electrical regen. Electrical regen is used in virtually all "battery-only" electric vehicles, and in most "all-hybrid" vehicles. However, as with any technology, there are restrictions which limit the effectiveness and efficiency of the process.

For electrical regen systems, the storage medium is almost exclusively batteries, and in some rare cases, ultra-capacitors. Battery based regen systems are limited in their efficiency and storage capacity by chemical restrictions which prevent more than an average of twenty percent (20%) of the recoverable braking energy to be stored for reuse. In terms of the one hundred percent (100%) recoverable kinetic energy available for capture, storage and reuse, this chemical limitation results in roughly eighty percent (80%) of the remaining recoverable energy to be lost forever as heat in the friction braking system.

As a rule, batteries are either power dense, meaning a high amount of power per volume unit, or energy dense, referring to a high amount of energy per volume unit. Rare and expensive exceptions do exist that combine power density and energy density. However, their use in motive applications are very limited in scope, and these batteries are more generally used in stationary applications such as for grid-level electrical energy storage. Also, because batteries are either power or energy dense, their use in electric and hybrid vehicles suffer from operational functionalities which reduce their overall effectiveness, and thus reduce their range and/or performance at a given acceptable cost. Therefore, a more efficient means that electrical regen is needed for the recovering, storing and reusing of recoverable decelerative energy.

In an effort to provide a more effective and efficient regen system, hydraulic regen has gained attention due to its low cost, robust performance, durability and high efficiency. Hydraulic regen utilizes existing, market proven hydraulic components to perform the same function as electrical regen, wherein hydraulic accumulators are used as the "battery," and hydraulic pumps and motors are used as the electrical motor and generator. Hydraulic regen systems provide benefits not available in electrical regen systems.

However, even hydraulic regen systems have drawbacks which limit overall performance and effectiveness. Hydraulic accumulators also have restrictive aspects in their operational parameters as a regenerative braking system, most importantly their lack of compact energy density. Hydraulic accumulators are restricted by volume, wherein a given volume of hydraulic fluid will provide a limited amount of acceleration before the fluid is exhausted and meaningful assistance ends. Academic research, prototype development and commercialized hydraulic regen only systems have proven to capture roughly eighty percent of the recoverable braking energy in a decelerating fossil fueled powered vehicle. In order for an accumulator based recovery system to have meaningful energy density, prohibitively large volumes must be utilized on board a vehicle. With space being at a premium in vehicular design, and weight being another important design factor, use of hydraulic regenerative systems is limited to specific applications, such as off road construction equipment, rail based transport, larger on road vehicles, and other similar uses.

In order to provide a balanced solution to the individual power density and energy density issues associated with each type of technology, and therefore maximize the efficiency and performance of the regen process, an electric/hydraulic hybrid regen system was developed utilizing the best positive attributes of both electrical and hydraulic regen systems while simultaneously eliminating the negative operational limitations of each individual technology. Such a combined dual regenerative drive system is disclosed in U.S. Pat. No. 7,201,095 ("'095 Patent"), incorporated herein by reference in its entirety for all purposes.

The '095 patent discloses both electrical and hydraulic regen, allowing for an onboard power dense hydraulic accumulator storage medium and an energy dense electrical storage medium. Combining these two technologies provides an optimized balance of power and energy densities utilizing specific electrical and hydraulic components. The '095 patent further discloses that deceleration energy is captured by at least one first hydraulic pump/motor through a rotational connection to at least one drive wheel. The first hydraulic pump provides the ability to move fluid through a second hydraulic pump/motor via fluidic connection to operate a rotationally connected electrical motor/generator which produces electrical energy to charge at least one battery, thereby providing hydraulically driven electrical regen. To maximize the efficiency and optimize the rate of charge to the battery, the torque and speed of the electrical generator is adjustable by utilizing at least one variable displacement hydraulic pump/motor so the input rotational speed of the first hydraulic pump/motor is independent of the output speed of the second hydraulic pump/motor.

Additionally, the '095 patent discloses the ability to bifurcate the input energy of the system into electrical and hydraulic storage. Therefore, the fluid may be routed in such a fashion as to fill at least a portion of at least one high pressure hydraulic accumulator by drawing fluid from at least one low pressure hydraulic fluid reservoir and directing said fluid to the high pressure hydraulic accumulator. The filling of the hydraulic accumulator can occur independent of or in conjunction with the electrical regenerative function via specific routing of the hydraulic fluid as described in the '095 patent.

Further, the '095 patent describes an operational modality of dual stored energy use that provides a stored hydraulic power launch and an electrically driven hydraulic drive wherein the short duration but high power density of the hydraulic accumulator is best suited to provide the power required to break inertia and launch a vehicle from a standstill and/or provide acceleration of a slowly moving vehicle while eliminating any electrical energy discharge from the battery. As the hydraulic accumulators volume is depleting and thus the pressure is falling, the electrically driven variable hydraulic drive system is utilized to either continue the vehicles acceleration and/or maintains the vehicles speed depending on the required operational input.

Although the '095 patent teaches a specific primary hydraulic input/output architecture to achieve the desired results of dual regenerative braking and dual power use, the design has application limitations that need to be addressed and remedied.

Therefore, new systems for improved recovery of kinetic energy are desirable, and in particular, alternative architectures are needed which afford more applications utilizing the synergy of combined dual use hydraulic and electric technologies.

SUMMARY

In various embodiments, the system recovers a majority of the recoverable energy from deceleration otherwise lost as dissipated heat, and directs that energy to a hydraulic accumulator using the existing drive system of an EV (an Electric Vehicle). Further, the system reuses stored hydraulic energy to launch the vehicle or assists in reacceleration of the vehicle, thereby eliminating or reducing the high current electrical energy discharge, while increasing the range and overall efficiency of the vehicle.

In various embodiments, the system comprises the recovery of kinetic energy provided in deceleration of a vehicle. The system comprises a controller configured to proportion only a safe portion of the available electricity to the battery for recharging. The remaining electrical energy not routed to the battery for charging is sent to a hydraulic regen system, wherein energy is stored as hydraulic pressure. The present system further comprises a second motor/generator electrically connected to the battery and wheel-connected motor/generator via the controller, and is rotationally connected to at least one hydraulic pump/motor. Hydraulic fluid connections of the pump/motor comprise at least one of a reservoir and a high pressure accumulator.

In various embodiments, a system for the recovery of kinetic energy comprises: a first electric motor/generator rotationally connected to at least one kinetic energy input; (ii) a battery; (iii) an electric/hydraulic regen system comprising a second electric motor/generator; and (iv) an EV drive regen controller. The controller is capable of proportioning electrical energy generated from rotation of the first electric motor/generator between the battery and the second electric motor/generator. The percentage of the electrical energy proportioned to the battery may b at least partly dependent on the charge rate limitation of the battery, with the remaining percentage proportioned to the second electric motor/generator. The at least one kinetic energy input may be the rotational energy from a wheel of a vehicle, such as a wheel decelerating. The electric/hydraulic regen system may further comprise an hydraulic pump/motor; an hydraulic control manifold; a low pressure accumulator; and a high pressure accumulator. The hydraulic pump/motor may be a variable displacement hydraulic motor or a fixed displacement hydraulic motor. In some examples, the electric/hydraulic regen system may further comprise hydraulic pressure sensors configured to control and limit incoming fluid to prevent overfilling of either of said accumulators.

In various embodiments, the system routes excess electrical energy from deceleration that cannot go to the battery to the second electric motor/generator. The second motor/generator is rotationally connected to the hydraulic pump/motor and rotates the pump/motor to cause a flow of fluid from a low pressure fluid reservoir to a high pressure fluid reservoir. This action effectively converts regenerative electrical energy to stored hydraulic energy in the accumulator. Hydraulic pressure sensors may be used to control and limit incoming fluid to prevent overfilling of the accumulator.

During acceleration, fluid from the high pressure accumulator is routed through the hydraulic pump/motor which rotates the second motor/generator to produce an electrical current. This hydraulically generated electricity may be routed to the controller and then to the wheel connected motor to launch/accelerate the vehicle. This provides initial hydraulic acceleration without causing the battery to discharge high current electricity, thereby saving the battery from high temperature discharge conditions. This system, by virtue of its operational functions, increases the vehicles range if the same number of batteries are used, and will allow the quantity of batteries to be reduced to achieve the same range as a non-hydraulically equipped EV.

In various embodiments, a method for using such a system is also disclosed. The method comprises rotating a first electric motor/generator via one or more kinetic energy input to generate an electric current; transmitting the electric current to an EV drive regen controller; and splitting the electric current between a battery and a second electric motor/generator via the EV drive regen controller.

In some examples, the EV drive regen controller may be capable of determining the percentage of electrical energy to proportion to the battery, and then will proportion the remaining generated electrical energy to the second electric motor/generator. The method may further comprise operating the second electric motor/generator to perform various functions, such as, for example, rotating a hydraulic pump. In such examples, the hydraulic pump/motor may operate as a pump, pumping fluid from a low pressure accumulator to a high pressure accumulator to be stored for future use. In one example, to use the fluid stored in the high pressure accumulator, it is released from the high pressure accumulator to cause a rotation of the hydraulic pump/motor, causing it to act as a hydraulic motor, rotating the second electric motor/generator, causing it to generate an electric current which may then rotate a shaft, for example the shaft connected to a vehicle wheel, assisting in an acceleration of a mass. In various additional examples, the generated electric current may accomplish a multitude of tasks, including initial acceleration or assistance in acceleration of a mass, operating an onboard device which uses electrical or hydraulic systems as a prime mover or a source of power, and operating a separate device which uses electrical or hydraulic systems as a prime mover or a source of power.

BRIEF DESCRIPTION OF THE DRAWINGS

The accompanying drawing is included to provide a further understanding of the disclosure and is incorporated in and constitutes a part of this specification, illustrate embodiments of the disclosure, and together with the description serve to explain the principles of the disclosure, wherein:

FIG. 1 illustrates a diagrammatic representation of an embodiment of a system for the recovery of kinetic energy in accordance with various embodiments.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the principles of the present disclosure.

In various embodiments, the system generally comprises the improved recovery of kinetic energy, such as the kinetic energy available in deceleration of an electric vehicle ("EV") and otherwise lost as dissipated heat. In general, the system improves upon both electrical regen and hydraulic regen systems individually and improves upon the combination of the two systems.

Various embodiments of the present system for the recovery of kinetic energy are novel and nonobvious improvements over an exemplary electric/hydraulic hybrid regen system previously disclosed in U.S. Pat. No. 7,201,095 and incorporated herein by reference in its entirety. Some of the component try for use in the present system may be found more thoroughly disclosed in U.S. Pat. No. 7,201,095, and is not repeated here for the sake of brevity. In general, the electric/hydraulic hybrid regen system previously disclosed in U.S. Pat. No. 7,201,095 features one electric motor/generator whereas the present inventive system comprises a first electric motor/generator; a second electric motor/generator; and a controller capable of proportioning electrical energy generated from the first electric motor/generator to both a battery (or series of batteries) and the second electric motor/generator. In effect, the previously disclosed hybrid system s now separated from the drive wheel of the vehicle by the controller and another electric motor/generator, rather than being directly connected to the drive wheel of the vehicle.

In various embodiments, the system comprises: an electric drive w/regen system further comprising an EV drive/regen controller, a battery and a first electric motor/generator; and an electric/hydraulic regen system further comprising a second electric motor/generator electrically connected to the EV drive e/regen system via the controller.

In various embodiments, a system for the recovery of kinetic energy comprises: a first electric motor/generator rotationally connected to at least one kinetic energy input; (ii) a battery; (iii) an electric/hydraulic regen system comprising a second electric motor/generator; and (iv) an EV drive regen controller, said controller capable of proportioning electrical energy generated from rotation of the first electric motor/generator between the battery and the second electric motor/generator. In various examples, the at least one kinetic energy input comprises a wheel of a vehicle in deceleration mode.

The electric/hydraulic regen system portion of the present system comprises: a second electric motor/generator; an hydraulic pump/motor; an hydraulic control manifold; a low pressure (fluid) accumulator; and a high pressure (fluid) accumulator. In various aspects, the hydraulic pump/motor may comprise a variable displacement hydraulic motor or a fixed displacement hydraulic motor. Further, the electric/hydraulic regen system may further comprise hydraulic pressure sensors to control and limit incoming fluid to prevent overfilling of the low pressure or high pressure accumulator with fluid.

In various embodiments, an exemplary system for the improved recovery of kinetic is illustrated in FIG. 1. The elements of the system depicted in FIG. 1 are set forth in TABLE 1 below. Abbreviated recitations of element descriptions may be used for brevity.

TABLE 1

Elements of an Improved System for the Recovery of Kinetic Energy

| Element | Description |
|---|---|
| 10 | Overall system for the improved recovery of kinetic energy |
| 20 | Electrical drive with regenerator system |
| 22 | First electric motor/generator input/output shaft |
| 23 | First electric motor/generator |
| 24 | Electrical connection between first electric motor/generator 23 and EV drive regen controller 25 |
| 25 | Electric Vehicle ("EV") drive regen controller |
| 26 | Electrical connection between EV drive regen controller 25 and battery 27 |
| 27 | Battery |
| 300 | Overall electric/hydraulic regen system |
| 301 | Electrical connection between EV drive regen controller 25 and System 300 |
| 302 | Second electric motor/generator |
| 303 | Rotational connection between second motor/generator 302 and hydraulic pump/motor 304 |
| 304 | Hydraulic pump/motor |
| 305 | Hydraulic fluid connection between hydraulic pump/motor 304 and hydraulic control manifold 306 |
| 306 | Hydraulic control manifold |
| 307 | Low pressure accumulator fluid connection |
| 308 | High pressure accumulator fluid connection |
| 311 | Low pressure accumulator |
| 312 | High pressure accumulator |

In various embodiments, and with reference now to FIG. 1, one or more kinetic energy input rotates a first electric motor/generator input/output shaft 22 during deceleration, causing rotation of a first electric motor/generator 23, thus generating an electric current. The electrical current (not depicted) is transmitted to EV drive regen controller 25 (or its equivalent) via electrical connection 24. The electrical current is bifurcated between an onboard battery 27 via electrical connection 26 and an electric hydraulic regen system 300 via electrical connection 301. The percentage of electrical current parsed between each of the battery 27 and system 300 is at least partly dependent on the charge rate limitation of battery 27. The remaining percentage of electrical current not sent to the battery 27 is sent to system 300.

In various embodiments, and with continued reference to FIG. 1, electrical current sent to system 300 operates a second electric motor/generator 302 as an electric motor, which rotates hydraulic pump/motor 304 as a hydraulic pump through rotational connection 303. Rotating hydraulic pump/motor 304 pumps fluid from a low pressure accumulator 311 to a high pressure accumulator 312 via hydraulic pump 304, fluid connection 305, low pressure hydraulic fluid connection 307, hydraulic control manifold 306, and high pressure hydraulic fluid connection 308, causing fluidic energy storage in high pressure accumulator 312.

In various embodiments, during acceleration, high pressure fluid is released from high pressure accumulator 312 through high pressure fluid connection 308 to manifold 306, then through fluid connection 305 to cause a rotation of hydraulic pump/motor 304, thereby causing hydraulic pump/motor 304 to act as a hydraulic motor. Fluid is then directed to the low pressure hydraulic accumulator through fluid connection 307, wherein the fluid is stored for the next deceleration cycle.

In various embodiments, rotating hydraulic motor 304 rotates the second electric motor/generator 302 through rotational connection 303, causing the second electric motor/generator 302 to act as an electrical generator. This hydraulically generated electrical current of system 300 is routed to the first electric motor/generator 23, thereby causing first electric motor/generator 23 to act as an electric motor that rotates input/output shaft 22, which is rotationally connected to a selected device. For example, in one non-limiting embodiment, shaft 22 is connected to at least one vehicle wheel, which in this embodiment would cause the vehicle to accelerate.

Due to the functions available in this design, in various embodiments, the system provides an electrically driven hydraulic system and a hydraulically driven electrical system which may be utilized for additional features. Therefore, it is to be construed that any operational and functional portion of system 300 may operate to perform any work, including, but not limited to, vehicle and/or mass initial acceleration or assistance in acceleration, operating an onboard or separate device such as power equipment or a lifting mechanism such as a human lifting bucket, and/or any equipment or device which may utilize electrical or hydraulic systems as a prime mover or source of power.

In various embodiments, the system also provides an add-on feature to existing electrically driven machines that may or may not utilize electrical regenerative braking. This system may also be configured to operate with a fossil fueled machine wherein a first electric motor/generator is added to facilitate the energy recovery. The first electric motor/generator may be rotationally connected to a wheel or other input/output device which can extract and add power, including but not limited to a wheel motor for fossil fueled vehicles, a drive shaft, crankshaft or transmission driven motor/generator, an elevator wherein energy is extracted or added via the electric motor or cabled device, material handling equipment such as a forklift or crane, a wind or tidal generator to assist in reducing and/or achieving cut in speed, mining and petroleum extraction equipment, rail and urban rail based transport, and the like.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the disclosure, to the full extent indicated by the broad, general meaning of the terms in which the appended claims are expressed. To the extent that these various modifications do not depart from the spirit and scope of the appended claims, they are intended to be encompassed therein.

What is claimed is:

1. A dual kinetic energy recovery system comprising: (i) a first electric motor/generator rotationally connected to at least one wheel of a vehicle to function as a kinetic energy input/output component; (ii) an electrical energy storage component; (iii) an electrically driven hydraulic regen system comprising at least one second electric motor/generator electrically connected to a regen drive controller, at least one hydraulic pump/motor of either a variable or fixed displacement type rotationally connected to said second electric motor/generator, at least one hydraulic fluid control apparatus, at least one low-pressure hydraulic accumulator or reservoir, at least one high-pressure hydraulic accumulator; (iv) necessary fluid and electrical connective components and sensors to help control hydraulic fluid rate and flow; and (v) a regen drive controller, wherein said controller prioritizes regenerative electrical braking energy from the kinetic energy input/output component to the second electric motor for pressurizing said electrically driven hydraulic regen system based on available hydraulic accumulator volume and pressure capacities, and subsequently directs any remaining electrical regen energy production from deceleration to the electrical energy storage component, capacities permitting.

2. The system of claim 1, wherein the electrical energy storage component is of any chemistry, any physically structured electron storage device, or any combination of any and all electrical energy storage component technology.

3. The system of claim 2, wherein said controller proportions regenerative electrical energy to the second electric motor for driving said electrically driven hydraulic regen system based on hydraulic accumulator volume and pressure capacities in the hydraulic regen system and to the electrical energy storage component based on its state of charge.

4. The system of claim 1, wherein more than one first electric motor/generator(s) are rotationally connected to more than one regenerative input device(s).

5. The system of claim 1, wherein the kinetic energy input/output device is any connective component to a work producing/consuming machine, device, apparatus or entity which is not a wheel of a vehicle.

6. The system of claim 1, wherein said hydraulic fluid is routed to the low-pressure accumulator or reservoir upon exiting the hydraulic pump/motor.

7. A method for the dual recovery of kinetic energy comprising: (i) a first electric motor/generator rotated via one or more kinetic energy input(s) to generate a regenerative electrical current; (ii) transmitting said regenerative electric current to an electrical regen drive controller; (iii) prioritizing application of said regenerative electric current from the electrical drive regen controller to a second electric motor/generator; (iv) said second electric motor/generator drives rotationally connected fixed or variable displacement hydraulic pump/motor as a pump to direct hydraulic fluid from the low-pressure hydraulic accumulator or reservoir to the high-pressure hydraulic accumulator to facilitate the pressurization of said electrically driven hydraulic energy storage system for a future use; and (v) charging said electrical energy storage component after electrically driven hydraulic energy storage system is at capacity.

8. The method of claim 7, wherein the prioritization of the applied regenerative electric current further comprises determining the available capacity of the electrically driven hydraulic energy storage system to safely import fluid from the electrically driven hydraulic pump/motor using said necessary fluid and electrical connective components and pressure sensors.

9. The method of claim 7, wherein the percentage of remaining regenerative electric current subsequently portioned to the electrical energy storage component is dependent on available storage capacity of the high-pressure hydraulic accumulator.

10. The method of claim 7, wherein regenerative electrical energy is proportioned between the electrically driven hydraulic energy storage system based on available storage capacity of the high-pressure hydraulic accumulator and the electrical energy storage component and its state of charge.

11. A dual kinetic energy recovery and drive system comprising: (i) a hydraulically driven electric current generation system comprising at least one high-pressure hydraulic accumulator, at least one low-pressure hydraulic accumulator or reservoir, at least one hydraulic fluid control apparatus, at least one hydraulic pump/motor of either a variable or fixed displacement type rotationally connected to at least one second electric motor/generator which is electrically connected to a regen drive controller; (ii) necessary fluid and electrical connective components, and sensors to help control hydraulic fluid rate and flow; (iii) an electrical energy storage component; (iv) a regen drive controller, wherein said controller, upon acceleration demand and the availability of stored high-pressure hydraulic fluid in the high-pressure accumulator, first prioritizes the electrical energy produced by hydraulically driven electric current generation system to the kinetic energy input/output component for acceleration, and subsequently draws any remaining electrical energy demand for additional acceleration and driving requirements from the electrical energy storage component, capacities permitting; and (v) a first electric motor/generator rotationally connected to at least one wheel to function as a kinetic energy input/output component.

12. The system of claim 11, wherein said regen drive controller inversely proportions to the kinetic energy input/output component increasing electrical energy from the electrical energy storage component relative to the decreasing hydraulic fluid volume and pressure in the high pressure accumulator and thus the electrical energy produced by the hydraulically driven electric generation system.

13. The system of claim 11, wherein the kinetic energy input/output device is any connective component to a work producing/consuming machine, device, apparatus or entity which is not a wheel of a vehicle.

14. The system of claim 12, wherein the electrical energy storage component is of any chemistry, any physically structured electron storage device, or any combination of any and all electrical energy storage component technology.

15. The system of claim 11, wherein said hydraulic fluid is routed to the low-pressure accumulator or reservoir upon exiting the hydraulic pump/motor in the hydraulically driven electrical generation system.

16. A method for the use of dual recovered kinetic energy comprising: (i) stored high-pressure hydraulic fluid in the high-pressure accumulator, wherein upon an acceleration demand and the availability of said stored high-pressure hydraulic fluid, is routed to a fixed or variable displacement hydraulic pump/motor to rotate said pump/motor as a motor to drive rotationally connected second electric motor/generator; (ii) said hydraulic fluid from said fixed or variable displacement hydraulic pump/motor is further routed to the low-pressure accumulator or reservoir for reuse; (iii) said hydraulically driven second electric motor/generator rotates as a generator to produce a current of electricity; (iv) said current of electricity from said hydraulically driven second electric motor/generator is transmitted to electrically connected regen drive controller; (v) said regen drive controller transmits said hydraulically driven second electric motor/generator current to one or more kinetic energy input/output components.

17. The method of claim 16, further comprising, after a predetermined duration of overall system inactivity such as a non-operational 'key off' event, said hydraulically driven electrical generation system operating as previously described to utilize and deplete stored high pressure hydraulic fluid to generate a current of electricity not to transmitting said electric current to said kinetic energy input/output component, but rather to said electrically connected regen drive controller for dedicated charging of said electrical energy storage component to prevent long term hydraulic system pressurization.

18. The method of claim 17, further comprising utilizing the hydraulically driven electrical generator's electric current to accomplish at least one operation selected from the group consisting of: initial acceleration or assistance in acceleration of a mass, operating an onboard device which uses electrical or hydraulic systems as a prime mover or a source of power, and operating a separate device which uses electrical or hydraulic systems as a prime mover or a source of power.

19. The method of claim 16, wherein, upon an acceleration demand and the availability of said stored high pressure hydraulic fluid, the prioritization of the applied hydraulically driven electrical generation system electric current is always utilized for any function whenever the potential exists to reduce or eliminate high current electrical energy demand from said electrical energy storage component.

\* \* \* \* \*